United States Patent [19]
Ishibashi et al.

[11] Patent Number: 5,897,843
[45] Date of Patent: Apr. 27, 1999

[54] EXHAUST GAS PURIFIER

[75] Inventors: Yoichi Ishibashi; Masahiro Asai; Kenjiro Saito, all of Wako, Japan

[73] Assignee: Honda Giken Kogyo Kabushiki Kaisha, Tokyo, Japan

[21] Appl. No.: 08/669,309

[22] PCT Filed: Nov. 6, 1995

[86] PCT No.: PCT/JP95/02253

§ 371 Date: Oct. 7, 1996

§ 102(e) Date: Oct. 7, 1996

[87] PCT Pub. No.: WO96/14499

PCT Pub. Date: May 17, 1996

[30] Foreign Application Priority Data

Nov. 7, 1994 [JP] Japan .................................. 6-296025

[51] Int. Cl.[6] .................................................. B01D 50/00
[52] U.S. Cl. ......................... 422/177; 422/178; 422/180; 422/181
[58] Field of Search ................... 422/177, 178, 422/180, 181

[56] References Cited

FOREIGN PATENT DOCUMENTS

| | | |
|---|---|---|
| 52-110317 | 9/1977 | Japan . |
| 56-115810 | 9/1981 | Japan . |
| 57-7767 | 2/1982 | Japan . |
| 3-229913 | 10/1991 | Japan . |
| 3-127017 | 12/1991 | Japan . |
| 3-286122 | 12/1991 | Japan . |
| 4-54212 | 2/1992 | Japan . |
| 7-38615 | 7/1995 | Japan . |

*Primary Examiner*—Edward J. Cain
*Attorney, Agent, or Firm*—Armstrong, Westerman, Hattori, McLeland & Naughton

[57] ABSTRACT

The described exhaust gas purifier arrangement for an internal combustion engine provides gas purification efficiency while maintaining high output levels by providing an annular thin-walled catalyst element surrounding gas discharge openings in an expansion pipe having a closed downstream end whereby gas flowing in the expansion pipe is caused to flow radially through the thin-walled catalyst element into a chamber from whence it is conducted to a silencer element for further processing prior to discharge from a tail pipe.

5 Claims, 11 Drawing Sheets

000# EXHAUST GAS PURIFIER

TECHNICAL FIELD

The present invention relates to an exhaust gas purifier in which an expansion pipe and a thin-walled catalyst element are disposed in an exhaust system of an internal combustion engine, thereby increasing purifying efficiency while keeping an output of an engine at a high level.

BACKGROUND ART

An exhaust gas purifier, shown in FIG. 11, has been disclosed in Japanese Patent Laid-Open No. Hei 3-22913, wherein a perforated pipe 02 having a plurality of ventilation holes 03 spaced apart from each other at intervals is disposed along the inner peripheral surface of an expansion chamber 01 connected to an exhaust port of an internal combustion engine.

In the purifier shown in FIG. 11, a tail pipe 04 directed toward the upstream side is disposed in the expansion chamber 01 at the downstream end thereof in such a manner as to be coaxial therewith. An exhaust gas passable catalyst 05 is mounted at the upstream end of the tail pipe 04. Part of the exhaust gas flowing from the exhaust port of the internal combustion engine into the expansion chamber 01 is brought into contact with a catalyst supported on the surface of the perforated pipe 03 positioned on the upstream side, to be thus purified; while the exhaust gas in the expansion chamber 01 is brought in contact with the exhaust gas passable catalyst 05 on the downstream side, to be thus purified.

The purifier shown in FIG. 11, however, has the following disadvantage. In such a purifier, the gas flowing nearer the inner peripheral surface of the expansion chamber 01, is significantly reduced in flow rate because presented by a resistance of the inner peripheral surface of the expansion chamber 01. As a result, most of the exhaust gas passing through the center of the expansion chamber 01 at a high flow rate tends not to be brought in contact with the catalyst supported on the perforated pipe 03 adjacent to the inner peripheral surface of the expansion chamber 01, and to be discharged from the tail pipe 04 to the exterior, thus failing to obtain a sufficient purifying effect by the catalyst supported on the pipe 03.

In this purifier, the exhaust gas passable catalyst 05 is disposed at the center of the downstream side of the expansion chamber 01 in such a manner as to project from the downstream side to the upstream side. Consequently, even if the size and shape of the expansion chamber 01 is set to enhance the scavenging efficiency by the inertia effect of an exhaust gas in a normal operational range of the internal combustion engine, as well as the blow-off preventive effect using a reflection wave of the exhaust gas, these effects cannot be achieved by the presence of the above exhaust gas passable catalyst 05, thus failing to enhancing the scavenging efficiency.

An exhaust gas purifier shown in FIG. 12 has been disclosed in Japanese Patent Laid-Open No. Hei 3-127017. This is modified from the purifier shown in FIG. 11. In this purifier, an upstream end 011 of an expansion pipe 010 formed in a shape similar to that of a prior art expansion chamber is connected to an exhaust port of a two-cycle internal combustion engine mounted on a motor-bicycle (not shown). The downstream end 012 (on the right side in the figure) of the expansion pipe 010 is closed. An exhaust pipe 013 is branched from the expansion pipe 010 at a position near the upstream end 011, and a thin-wall catalyst element 014 is disposed on the inner peripheral surface of the exhaust pipe 013 at a position near the upstream end. In the catalyst element 014, catalyst is supported on the surface just as in the perforated pipe 03 of the purifier shown in FIG. 11. The downstream end of the exhaust pipe 013 is connected to a silencer 015.

In the purifier shown in FIG. 12, the scavenging efficiency is improved because any component disturbing the reflection of a pressure wave is not present on the inner surface of the expansion pipe 010. However, like the catalyst supported on the pipe 03 shown in FIG. 11, exhaust gas cannot be sufficiently brought in contact with the catalyst element 014, thus failing to obtain a high scavenging efficiency.

DISCLOSURE OF INVENTION

According to the present invention, there is provided an exhaust gas purifier comprising:

an expansion pipe in which the upstream end is connected to the downstream end of an exhaust pipe connected to an exhaust port of an internal combustion engine and the downstream end is closed;

wherein an exhaust gas discharging opening is formed in said expansion pipe on the upstream side, and an exhaust gas passable thin-walled catalyst element is disposed around the outer periphery of said expansion pipe in such a manner as to face to said exhaust gas discharging opening.

With this configuration, exhaust gas flowing in the expansion pipe is not cooled by the pipe wall of the expansion pipe, and it radially passes through the exhaust gas discharging opening formed at the upstream end of the expansion pipe. The exhaust gas is then brought in contact with the exhaust gas passable thin-walled catalyst element provided outward from the opening. As a result, a high purifying efficiency can be obtained.

In the above expansion pipe, no catalyst is present. This makes it possible to avoid a change in exhaust gas temperature depending on heat of reaction of catalyst due to a change in air-fuel ratio. Thus, in a wide operational range, a stable reflection wave at a high level can be obtained, and thereby a high scavenging efficiency can be achieved. As a result, a high output can be expected.

In this configuration, exhaust gas in the expansion pipe is prevented from being increased in temperature due to heat of reaction of the catalyst in the expansion pipe, and is kept at a relatively low temperature. The expansion pipe can be reduced in size, to reduce the size and weight of the purifier, resulting in the reduced cost.

The thin-walled catalyst element may comprise a metal sheet having a plurality of holes and a catalyst supported on the surface of the metal sheet. With this configuration, the amount of an expensive catalyst can be reduced, and also the passing resistance of exhaust gas through the thin-walled catalyst element can be lowered. As a result, there can be obtained an inexpensive exhaust gas purifier being excellent in mass-production, the purifier improving the output of an internal combustion engine.

The outer periphery of the thin-walled catalyst element facing the exhaust gas discharging opening may be sealed by a sealing member, and the upstream end of a silencer containing a catalyst extending in the whole cross-section of a flow path may be communicated to a space sealed by the sealing member. With this configuration, if an exhaust gas is not sufficiently purified by the thin-walled catalyst element on the upstream side of the expansion pipe, it is brought in contact with the catalyst in the silencer disposed on the downstream side of the expansion pipe. Accordingly, the exhaust gas is certainly purified, and thereby the purifying efficiency can be further enhanced.

Preferably, the expansion pipe is formed in an elongated shape; an elongated silencer containing a catalyst is disposed on the line extending from the downstream end of the expansion pipe; a sealing member for sealing the outer periphery of the thin-walled catalyst element facing the exhaust gas discharging opening extends from the upstream side to the downstream side of the expansion pipe and reaches the upstream end of the silencer; and a space sealed by the sealing member is communicated to the expansion pipe and the silencer. With this configuration, an internal combustion engine including the exhaust gas purifier of the present invention can be mounted on a motor-bicycle with an excellent appearance.

A secondary air may be supplied to a portion on the downstream side from the exhaust gas discharging opening and on the upstream side from the catalyst in the silencer. With this configuration, secondary air can be supplied into the silencer containing a catalyst without any adverse effect on a pressure wave in the expansion pipe. As a result, exhaust gas can be more certainly purified.

BEST MODE FOR CARRYING OUT THE INVENTION

Figure 1:
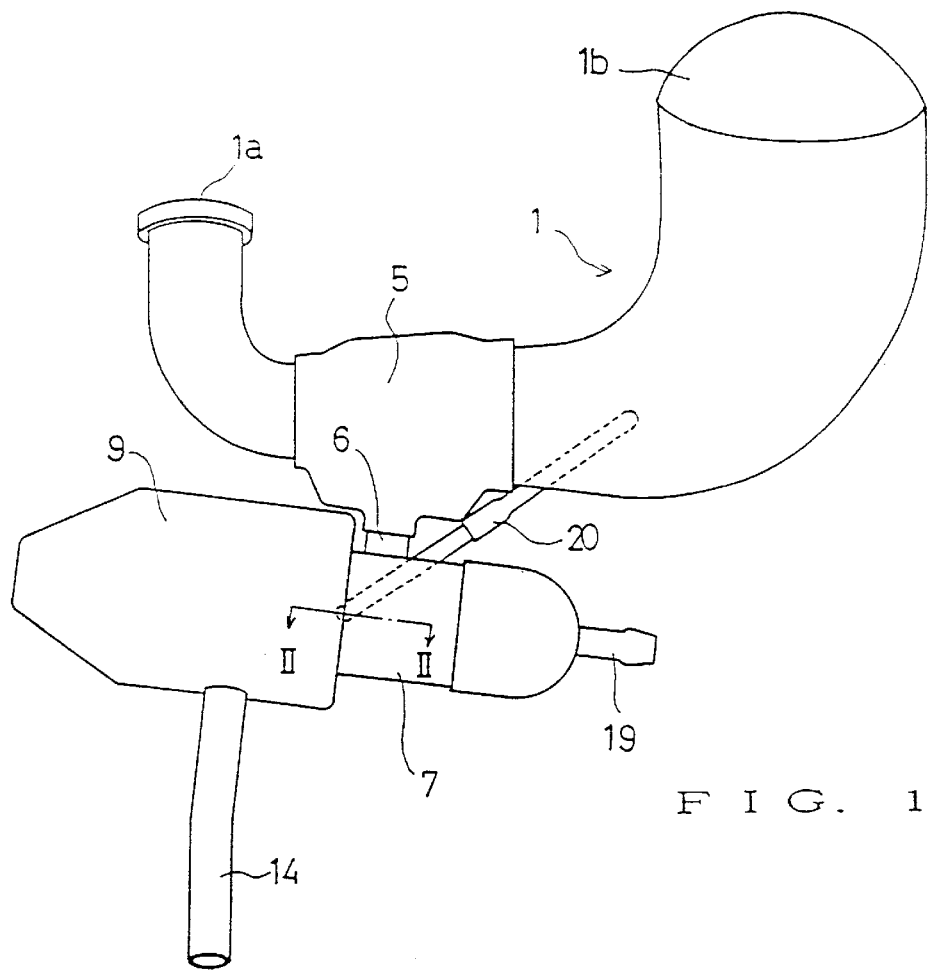
FIG. 1 is a side view of one embodiment of an exhaust gas purifier of the present invention.

Hereinafter, one embodiment of the present invention will be described with reference to FIGS. 1 to 3.

An opening 1a formed at the upstream end of an expansion pipe 1 is connected to an exhaust port of a two-cycle internal combustion engine mounted on a motor-bicycle (not shown). The expansion pipe 1 is formed of a stainless steel (SUS304) sheet which has been subjected to heat-resisting surface treatment. The expansion pipe 1 is gradually increased in diameter as nearing the downstream side, and is closed at the downstream end by means of an approximately semi-spherical pipe wall 1b. Namely, the size and shape of the expansion pipe 1 are determined to obtain a high scavenging efficiency by deriving both an inertia effect of an exhaust gas discharged from the two-cycle internal combustion engine (not shown) and a blow-off preventive effect using a reflection wave of the exhaust gas.

Two exhaust gas discharging openings 2 are formed in a peripheral wall of the expansion pipe 1 near the upstream end so as to be spaced from each other in the longitudinal direction (or in the circumferential direction). An exhaust gas passable thin-walled catalyst element 3 is disposed around the outer periphery of the expansion pipe 1 in such a manner as to surround the exhaust gas discharging openings 2. At this time, the catalyst element 3 is separated apart from the openings 2 by a certain gap. Both ends of the catalyst element 3 are curved toward the expansion pipe 1 and are fixed on the outer peripheral surface of the expansion pipe 1 by welding, or the like.

The catalyst element 3 includes a support formed of a stainless steel (SUS304) sheet having a plurality of small holes 4. A water-soluble silica made undercoat layer is formed on the inner and outer surfaces (including surfaces of the small holes 4) of the support. A wash coat layer of an active alumina base material mixed with a cerica-based additive and a silica-based binder is formed on the undercoat layer. A noble metal catalyst containing platinum (Pt) and rhodium (Rh) at a weight ratio of 20:1 is supported on the wash-coat layer at a ratio of 1–2 $g/m^2$.

The outer periphery of the catalyst element 3 is sealed by a sealing sheet 5. An opening 5a is formed in the sealing sheet 5 on the side opposed to the exhaust gas discharging openings 2 of the expansion pipe 1. A communicating pipe 6 is fitted at the upper end thereof in the opening 5a of the sealing sheet 5. The communicating pipe 6 passes through an opening 7a of a silencer casing 7 which is disposed in such a manner as to be adjacent to, and substantially in parallel with the expansion pipe 1. As shown in FIG. 2, a lower end portion 6a of the communicating pipe 6 is U-shaped in cross-section and is opened to the downstream side (on the left side in FIG. 3) of the silencer casing 7.

A monolithic catalyst 8 having a honey-comb cross-section is charged in the silencer casing 7 on the downstream side. An outer casing 9 is disposed in such a manner as to coaxially surround the outer periphery of the monolithic catalyst 8. A conical end plate 10 is mounted at the downstream end of the silencer casing 7. A plurality of small holes 11 are formed in the end plate 10. A silencer chamber 12 formed between the silencer casing 7 and the outer casing 9 is partitioned into two parts by means of a partitioning plate 13. Several pieces of communicating pipes different in length (not shown) pass through the partitioning plate 13, and a tail pipe 14 passes through the outer casing 9. Noise of exhaust gas in the silencer chamber 12 is thus attenuated.

A space 15 in the silencer casing 7 is partitioned into spaces 15a, 15b by means of a partitioning plate 16 provided upstream of the communicating pipe 6 (on the right side in the figure). Communicating ports 17 are formed in the partitioning plate 16. The space 15b is partitioned by means of a check valve (reed valve) 18, to form a space 15c on the right side of the space 15b. A secondary air introducing pipe 19 is fitted in the upstream end of the silencer casing 7 (at the right end in the figure) to be communicated to the space 15c.

The interior of the expansion pipe 1 is communicated to the space 15a of the silencer casing 7 by means of an unburnt oil recovering pipe 20, and a check valve 21 is interposed in the unburnt oil recovering pipe 20.

Figure 2:
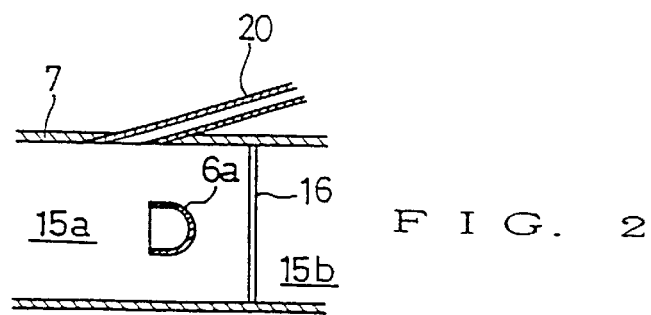
FIG. 2 is a vertical sectional view taken on line II—II of FIG. 1.
Figure 3:
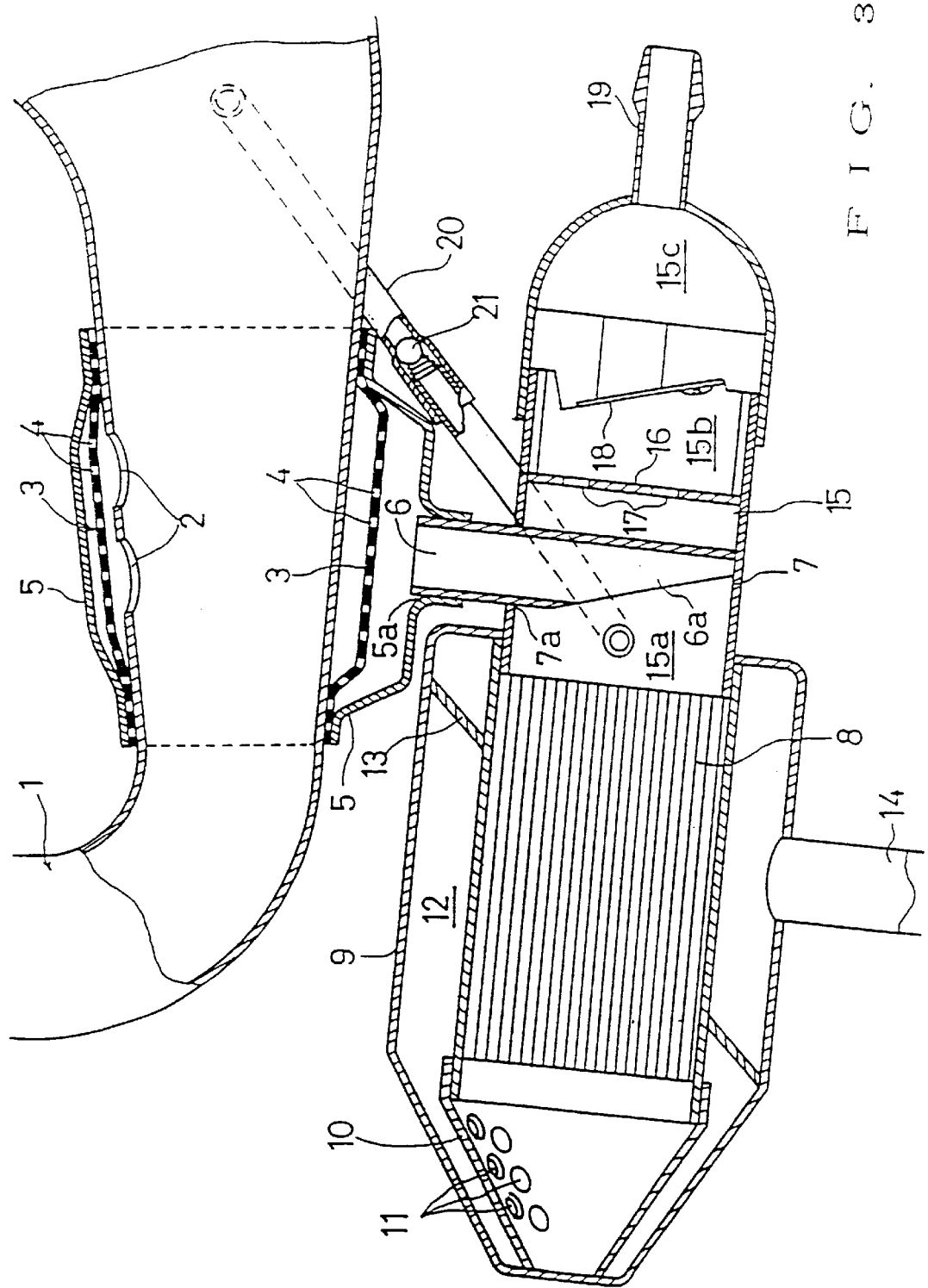
FIG. 3 is vertical sectional view of essential portions of FIG. 1.

In the embodiment shown in FIGS. 1 to 3, exhaust gas discharged from the two-cycle internal combustion engine (not shown) flows in the expansion pipe 1, and, thereafter, it does not reach the semi-spherical pipe wall 1b at the downstream end of the expansion pipe 1 but passes through the exhaust gas discharging openings 2 near the upstream end opening 1a. The exhaust gas is then brought in contact with the thin-walled catalyst element 3, flowing in the space 15a in the silencer casing 7 from the space surrounded by the sealing thin plate 5 through the communicating pipe 6, and is brought in contact with the monolithic catalyst 8. After that, the exhaust gas flows in the silencer chamber 12 through the small holes 11 to be attenuated in exhaust noise, and, thereafter, it is discharged from the tail pipe 14 to the atmospheric air.

The exhaust gas at a high temperature allowed to flow in the expansion pipe 1 is discharged from the exhaust gas discharging openings 2 near the upstream end opening 1a, and the exhaust gas near the semi-spherical pipe wall 1b at the downstream end of the expansion pipe 1 is not heated at a high temperature and thereby it is kept at a low temperature. An average temperature of the entire exhaust gas in the expansion pipe 1 is thus lowered, and thereby the propagating speed of the exhaust gas is reduced. As a result, the expansion pipe 1 can be reduced in size.

Since any catalyst disturbing the reflection of the pressure wave of exhaust gas is not present in the expansion pipe 1, the inertia effect of an exhaust gas by the expansion pipe 1 and the blow-off preventive effect using the reflection wave of the exhaust gas can be sufficiently achieved. As a result, the scavenging efficiency can be enhanced, and, thereby, the output of the internal combustion engine can be improved.

After passing through the exhaust gas discharging openings 2, the exhaust gas passes through the small holes 4 of the catalyst element 3 in the radial direction in the state that it is not lowered in temperature so much, and is brought in contact with the entire surface of the catalyst element 3. Furthermore, in the space 15a, the exhaust gas is brought in contact with the monolithic catalyst 8 in the state that a necessary secondary air is supplied through the secondary air introducing pipe 19, check valve 18, space 15b and the communicating opening 17, to be thus sufficiently purified. The purifying performance of the exhaust gas can be thus sufficiently enhanced.

Unburnt oil mixed in the exhaust gas is separated therefrom in the expansion pipe 1, and is fed into the space 15a at a high temperature through the unburnt oil recovering pipe 20, to be thus sufficiently burnt.

Another embodiment of the present invention will be described with reference to FIGS. 4 to 6.

A casing 30, which is divided into right and left parts, is formed in an elongated shape, being substantially similar to that of a common expansion chamber provided on an on-road or off-road motor-bicycle. The casing 30 has an exhaust gas suction opening 31 at the upstream end. Ribs 30a projecting outward along the division surfaces are integrated with each other by welding. The casing 30 is partitioned at a position separated apart from the exhaust gas suction opening 31 by about two-third of the whole length, into an expansion chamber 33 and a silencer 34 by means of a partitioning plate 32. The exhaust gas suction opening 31 is connected to an exhaust port of a two-cycle internal combustion engine (not shown). The expansion chamber 33 has such a size and shape as to achieve a high scavenging efficiency similar to that in the expansion pipe 1 described in the embodiment shown in FIGS. 1 to 3.

An unburnt oil recovering passage 35 is formed in the bottom of the partitioning plate 32 for discharging unburnt oil separated from the exhaust gas in the expansion chamber 33 into the silencer 34.

In the casing 30, two exhaust gas discharging openings 36 are formed in a lower portion relatively near the exhaust gas suction opening 31. As in the embodiment shown in FIGS. 1 to 3, a thin-walled catalyst element 37 having small holes 38 encloses the outer periphery of the exhaust gas discharging openings 36.

A sealing sheet 40 is fixed to the casing 30 in such a manner as to surround the entire periphery of the catalyst element 37, and to seal the exhaust gas discharging openings 36, small holes 38, and a communicating port 39 disposed downstream of the partitioning plate 32 in the state being opened to the silencer 34. A secondary air introducing pipe 42 is disposed in a communicating passage 41 sealed by the casing 30 and the sealing sheet 40. The rear portion (right side in the figure) of the secondary air introducing pipe 42 extending in the longitudinal direction passes through the sealing sheet 40 and projects to the exterior. A reed valve 43 is provided at the front end of the secondary air introducing pipe 42. Secondary air is supplied into the secondary air introducing pipe 42 from a secondary air supply apparatus (not shown) connected to the rear end of the secondary air introducing pipe 42, and it is conducted along the communicating passage 41 by the pipe 42 and through the reed valve 43. On the other hand, exhaust gas flows in the expansion chamber 33 from the internal combustion engine (not shown), passing through the exhaust gas discharging openings 36 and the small holes 38, and flows in the communicating passage 41. In the communicating passage 41, the exhaust gas is mixed with the above secondary air, before being discharged into the silencer 34.

In the communicating passage 41 sealed by the casing 30 and the sealing sheet 40, a thin-walled catalyst element 44 is provided under the secondary air introducing pipe 42 in such a manner as to extend in the longitudinal direction of the expansion chamber 33. The catalyst element 44 has small holes as in the catalyst element 37, and is formed in a hat shape in cross-section.

Two circular thin-walled catalyst elements 45 having small holes, similar to the catalyst element 37, are disposed on the upstream side of the silencer 34. The catalyst elements 45 are spaced from each other at a specified interval in the direction perpendicular to the longitudinal direction of the casing 30. Two partitioning plates 46a, 46b are provided on the downstream side of the catalyst elements 45. An upstream side silencer chamber 47a and a downstream side silencer chamber 47c respectively partitioned by the partitioning plates 46a, 46b are communicated to each other by means of a communicating pipe 48 passing through the partitioning plates 46a, 46b. An intermediate silencer chamber 47b is formed between the upstream side silencer chamber 47a and the downstream side silencer chamber 47c. The intermediate silencer chamber 47b is communicated to the downstream side silencer chamber 47c by means of a communicating port 49. A tail pipe 50 is passed through the downstream end of the casing 30 and the partitioning plate 46b on the downstream side.

Figure 4:
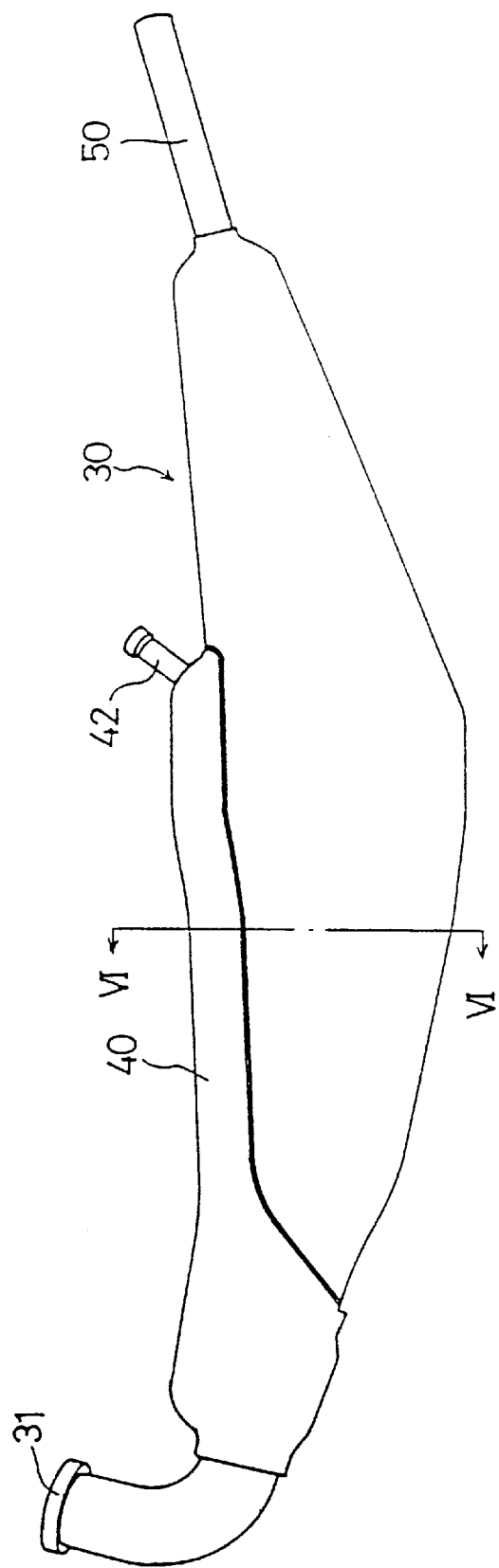
FIG. 4 is a side view of another embodiment of the present invention.
Figure 5:
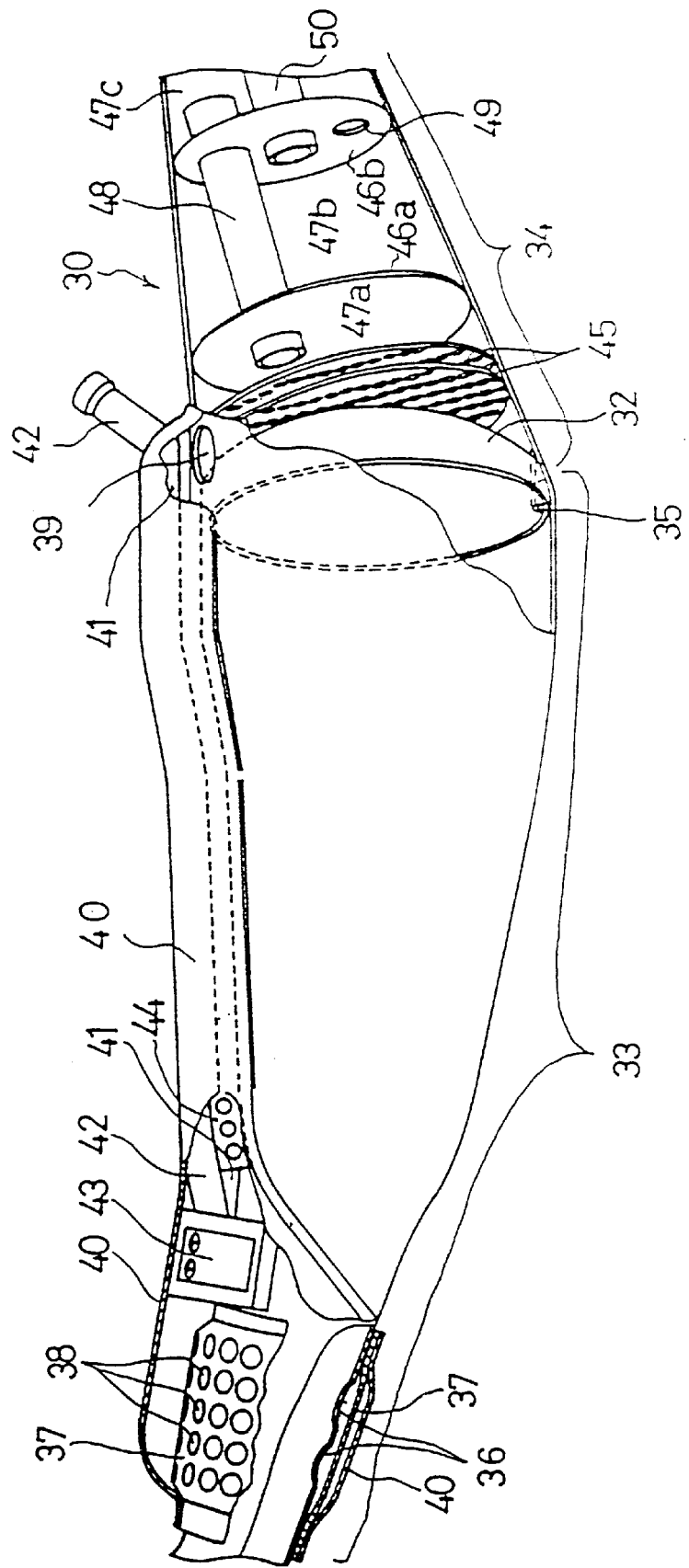
FIG. 5 is an enlarged vertical sectional view of essential portions of FIG. 4.
Figure 6:
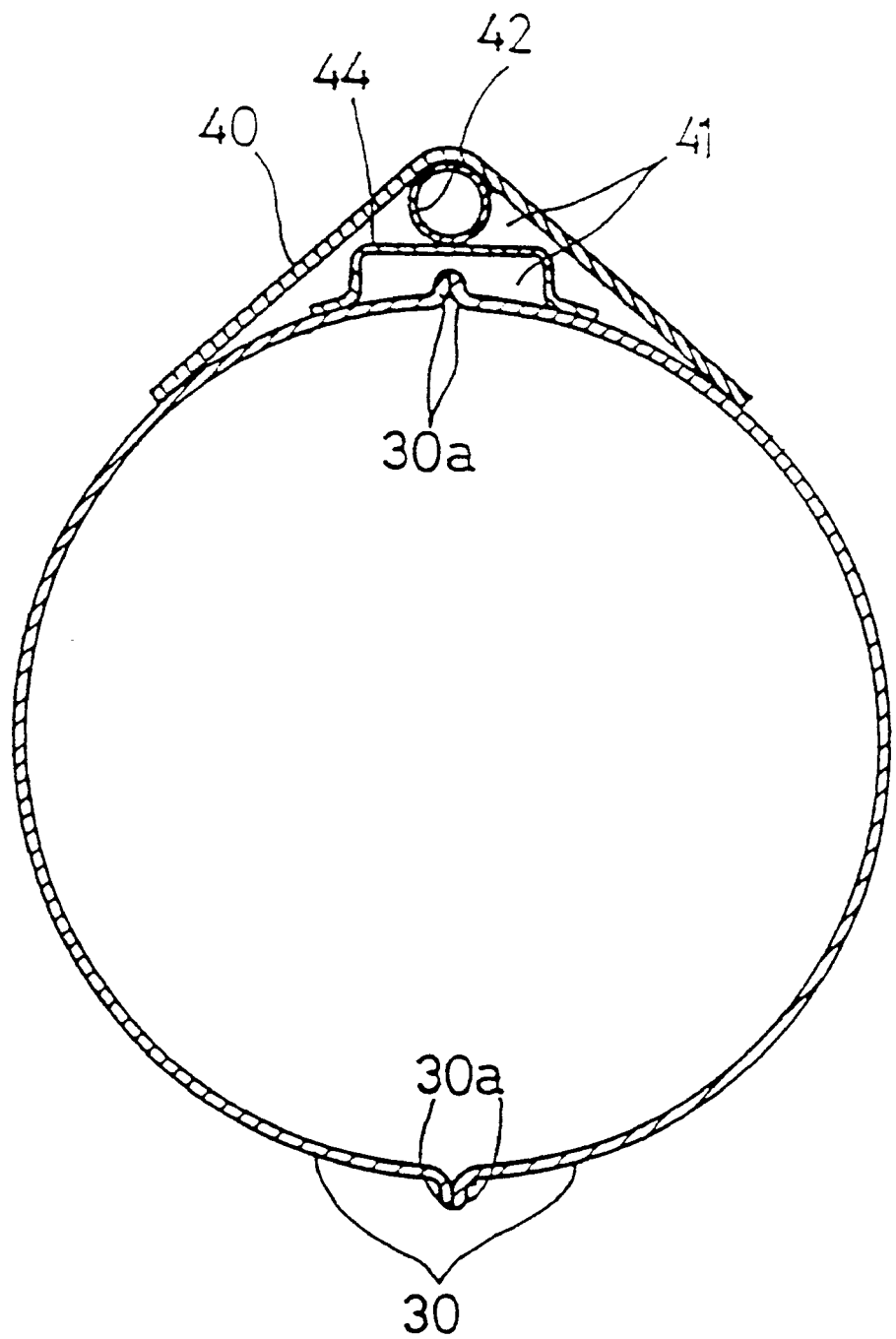
FIG. 6 is a transverse sectional view taken on line VI—VI of FIG. 4.

The embodiment shown in FIGS. 4 to 6 is operated in the same manner as in the previous embodiment shown in FIGS.

1 to 3, and therefore, similar effects can be obtained. Hereinafter, effects of this embodiment due to a difference in structure from the previous embodiment will be described.

The expansion chamber 33 and the silencer 34 are integrated with each other by means of the common casing 30, and, accordingly, they can be made compact, and also increased in resistance against vibration and impact because of the forcible integration structure thereof.

The casing 30 containing the expansion chamber 33 and the silencer 34 has an elongated shape similar to that of the prior art expansion chamber, and, thereby, it can be curved in a desired shape in accordance with the layout of a motor-bicycle (not shown), thus enhancing the appearance of the motor-bicycle.

In this embodiment, the thin-walled catalyst element 37 is provided around the outer periphery of the exhaust gas discharging openings 36 and also the thin-walled catalyst elements 44 are disposed in the elongated communicating passage 41 sealed by the casing 30 and the sealing sheet 40. Accordingly, an exhaust gas discharged from the catalyst element 37 flows in the silencer chamber 47a through the communicating port 39 through the communicating passage 41, and is then brought in contact with the catalyst elements 44. As a result, the purifying efficiency can be further enhanced.

The silencer 34 is also formed in a relatively elongated shape, and further, three silencer chambers 47a, 47b and 47c are formed by two partitioning plates 46a, 46b. This makes it possible to easily obtain desired noise reducing characteristics.

Next, there will be described experiments for examining changes in pressure wave in the expansion pipe in which the cross-section is gradually increased toward the downstream side and the positions of the exhaust gas discharging openings are changed. For comparison, the prior art expansion pipe is also examined, in which the cross-section is gradually increased and is then reduced (the exhaust gas discharging opening faces to the exhaust gas suction port at the downstream end). The results are shown in FIGS. 7 to 10.

Figure 7:
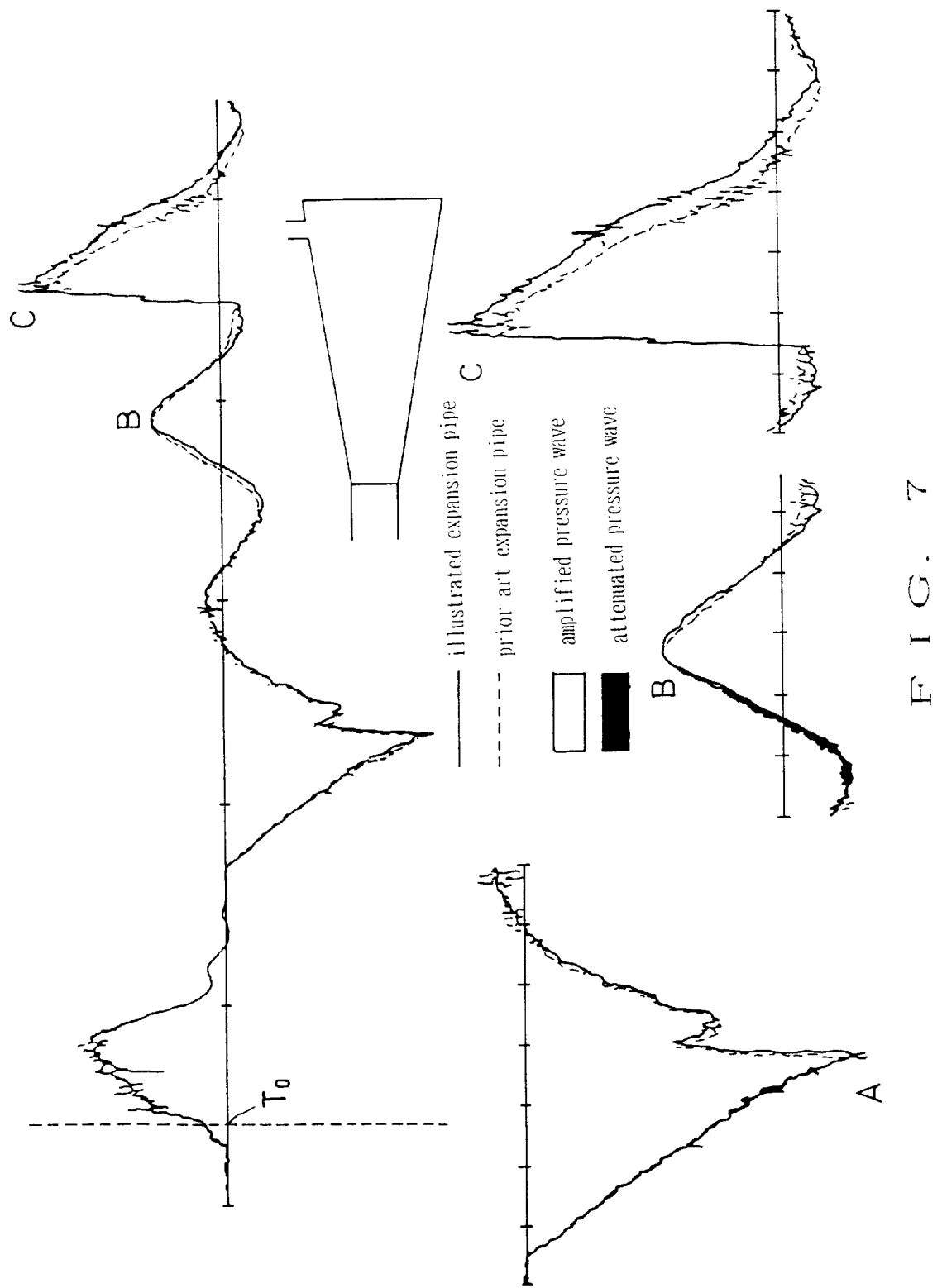
FIG. 7 is a characteristic diagram showing changes in pressure in an exhaust port, with respect to a prior art expansion pipe in which the cross-section is gradually increased toward the downstream side and is then reduced, and an expansion pipe in which the cross-section is gradually increased and an exhaust gas discharging opening is formed in the peripheral surface on the enlarged downstream side.

FIG. 7 is a graph showing pressure waves (shown by the solid line), with respect to the expansion pipe (schematically shown in FIG. 7) in which the exhaust gas discharging openings are formed in the side wall of the expansion pipe on the downstream side, and the prior art expansion pipe. Specifically, this graph shows changes in pressure in an exhaust port with an elapse of time since the exhaust port of a two-cycle internal combustion engine is opened (the opened time is shown by the broken line on the left side).

In the expansion pipe shown in FIG. 7, the area of a white portion in which the pressure is amplified more than the prior art type is wider than the area of the black portion in which the pressure is attenuated. As a result, the scavenging effect is increased.

Figure 8:
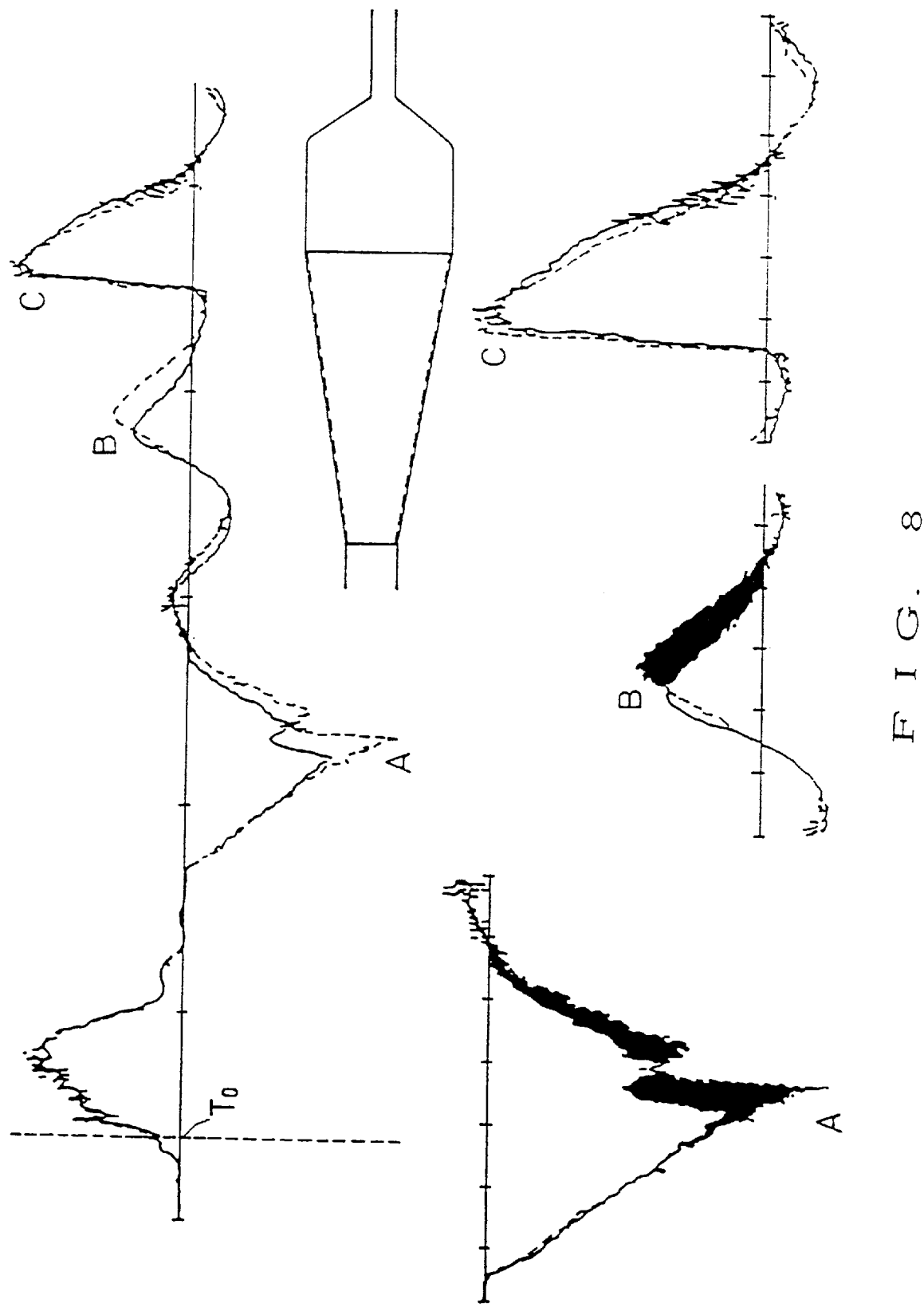
FIG. 8 is a characteristic diagram showing changes in pressure in an exhaust port, with respect to the prior art expansion pipe, and an expansion pipe modified from the prior art type in that a thin-wall catalyst element with small holes is disposed on the inner peripheral surface of the expansion pipe.

FIG. 8 is a graph showing changes in pressure in an exhaust port, with respect to an expansion pipe modified from the prior art type in which a thin-walled catalyst element having a plurality of small holes is provided on the inner peripheral surface of an enlarged portion of the expansion pipe, in comparison with the prior art expansion pipe. The area of the white portion is narrower than that of the black portion. As a result, in such an expansion pipe, the scavenging efficiency is low.

Figure 9:
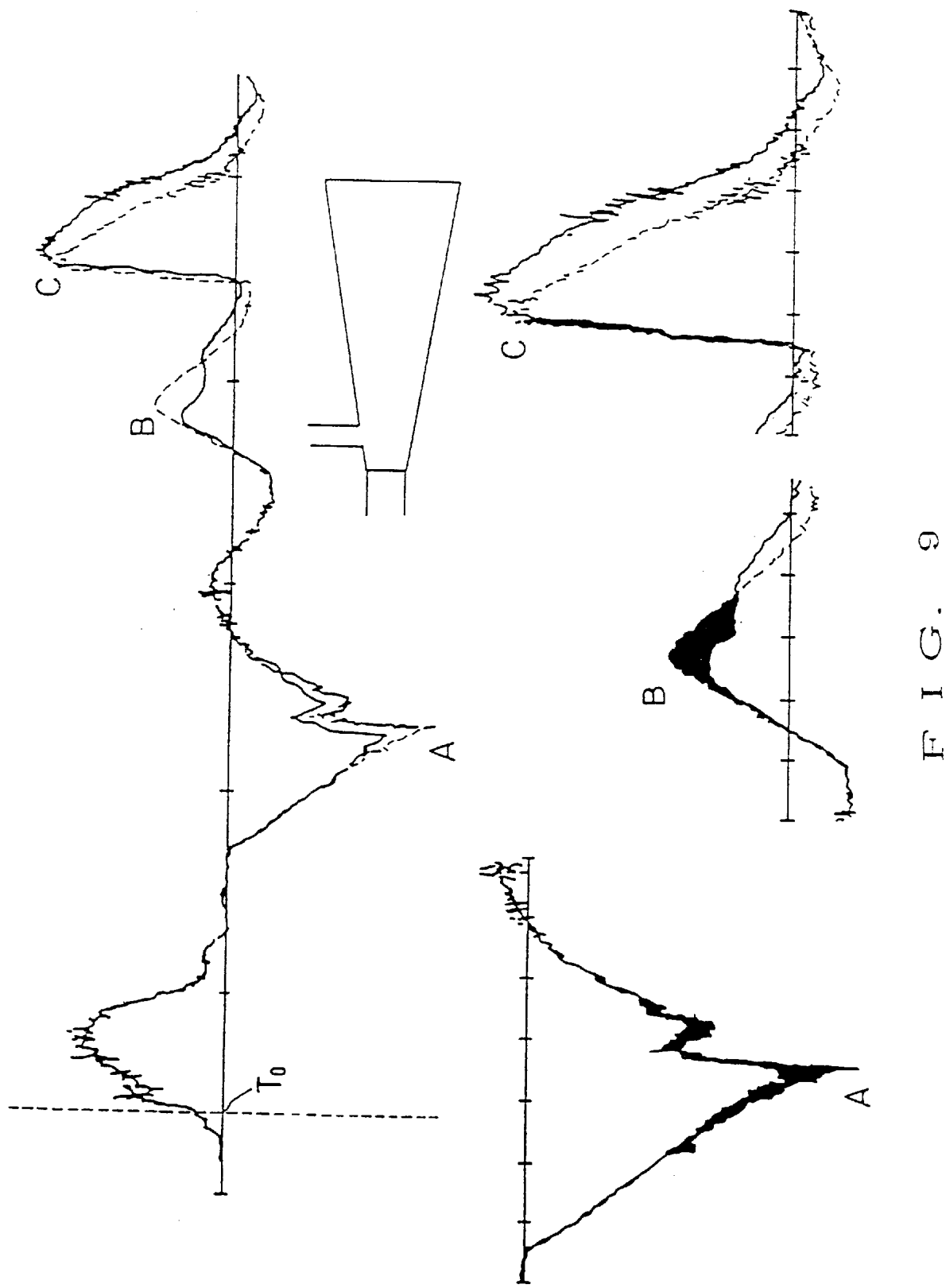
FIG. 9 is a characteristic diagram showing changes in pressure in an exhaust port, with respect to the prior art expansion pipe, and an expansion pipe in which the cross-section is gradually increased toward the downstream side and an exhaust gas discharging opening is formed on the peripheral surface on the enlarged upstream side.
Figure 12:
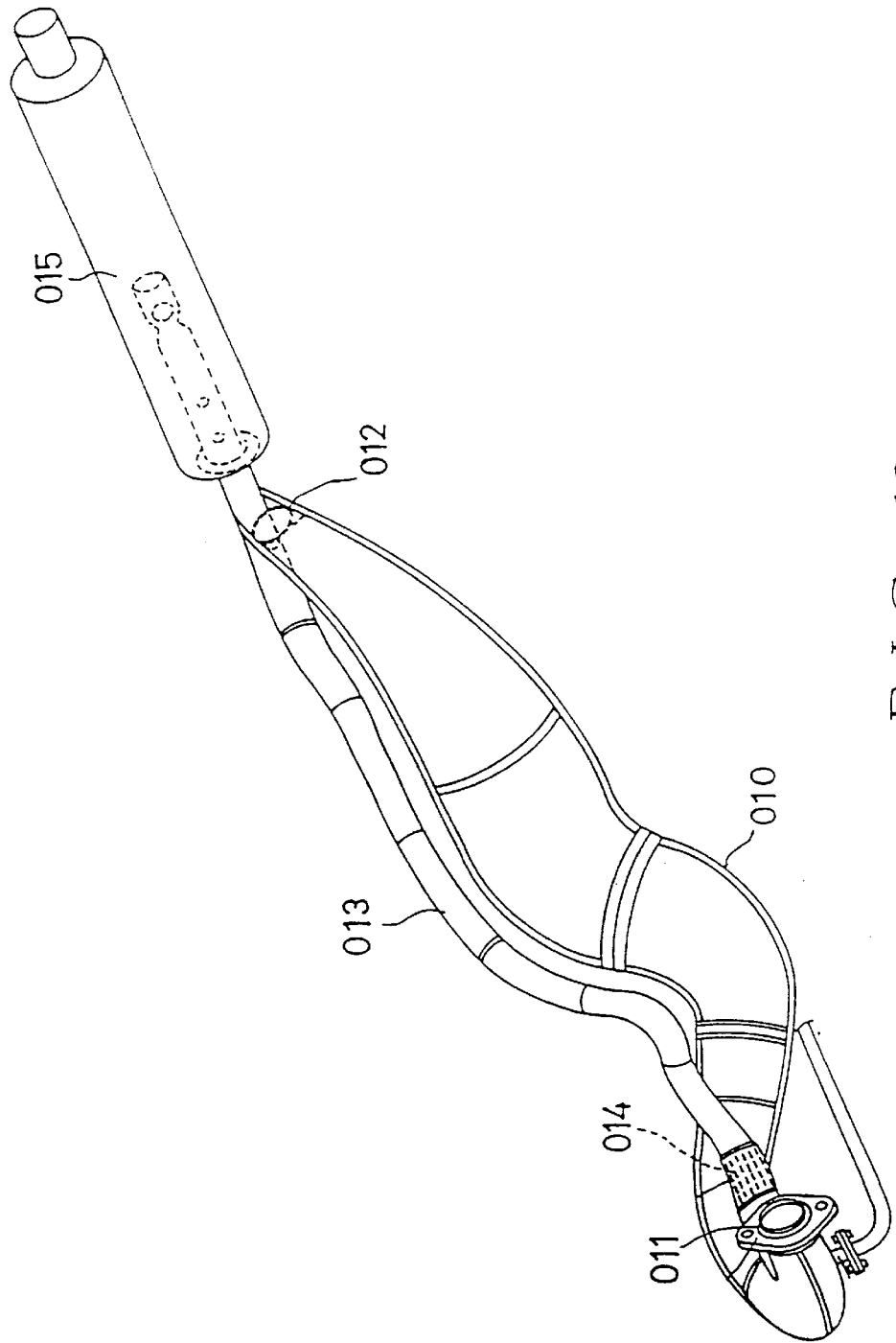
FIG. 12 is a side view of another prior art exhaust gas purifier, with parts being partially omitted.

FIG. 9 is a graph showing changes in pressure in an exhaust port, with respect to expansion pipe shown in FIG. 12 in which the exhaust gas discharging openings are provided on the peripheral surface near the upstream end, in comparison with the prior art expansion pipe. As compared with the prior art expansion pipe, the area of the white portion is wider than that of the black portion, thus showing a high scavenging efficiency.

Figure 10:
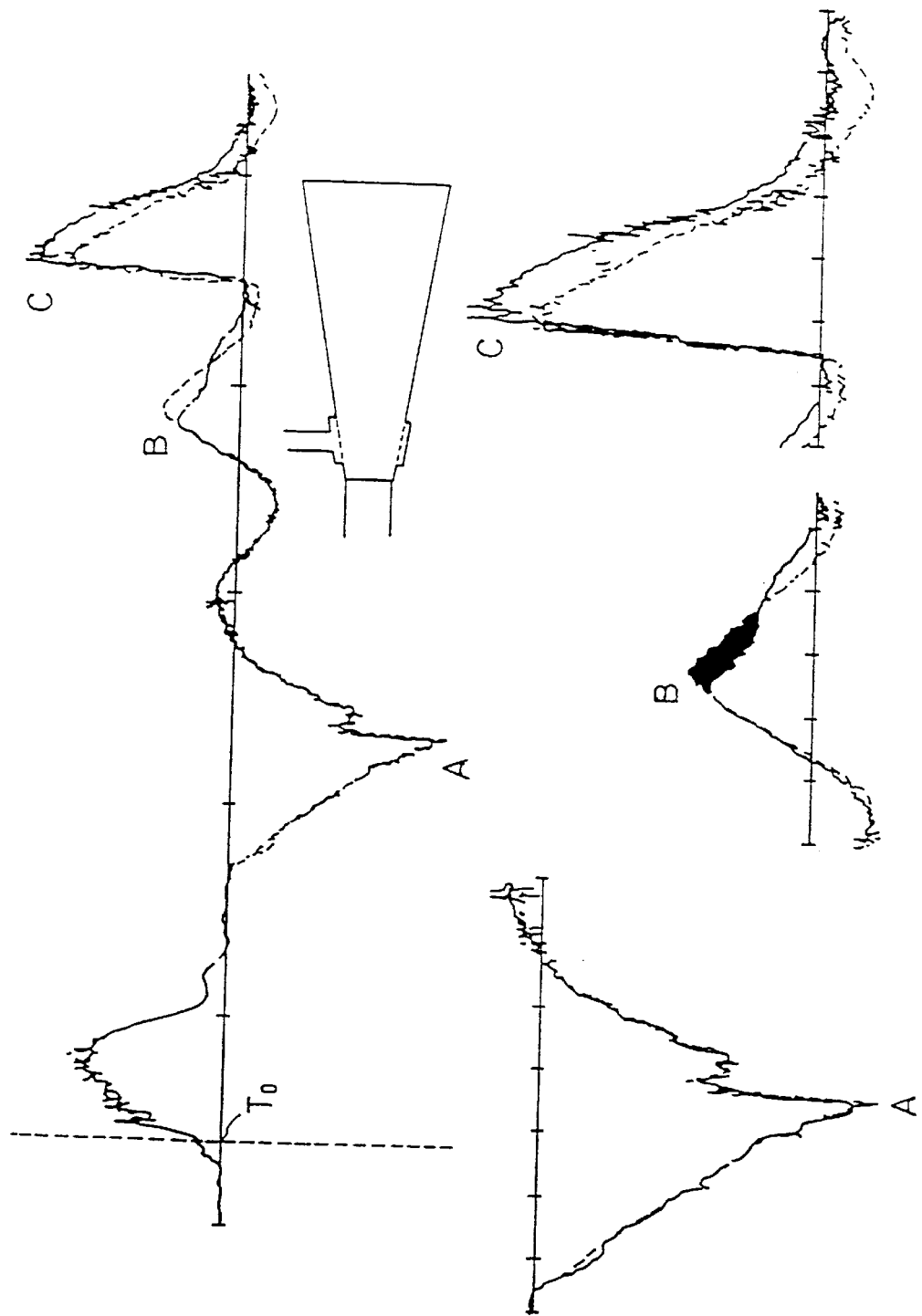
FIG. 10 is a characteristic diagram showing changes in pressure in an exhaust port, with respect to the prior art expansion pipe, and the expansion pipe shown in FIG. 9 to which the exhaust gas purifier of the present invention is applied.
Figure 11:
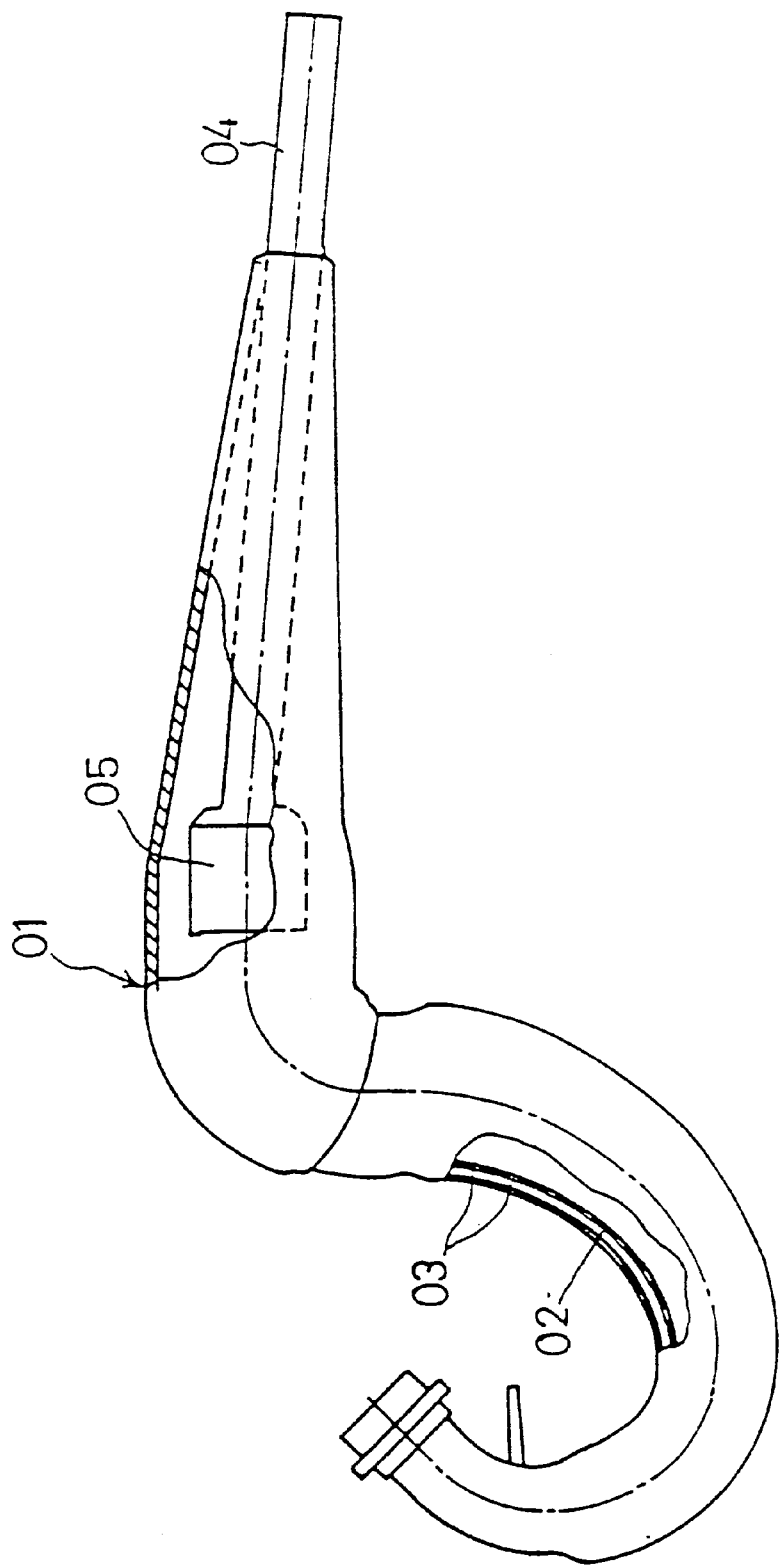
FIG. 11 is a side view of a prior art exhaust gas purifier, with parts being partially omitted.

FIG. 10 is a graph showing changes in pressure in an exhaust port, with respect to the expansion pipe of the present invention in which the thin-walled catalyst element having small holes facing the exhaust gas discharging openings near the upstream end of the expansion pipe, in comparison with the prior art expansion pipe. It is revealed that a high scavenging efficiency similar to that shown in FIG. 9 can be obtained.

As is apparent from the above experimental results, according to the present invention, the scavenging efficiency can be enhanced.

Industrial Applicability

The exhaust gas purifier of the present invention is applicable to an exhaust system of an internal combustion engine to increase purifying efficiency while keeping the output of the engine at a high level.

We claim:

1. An exhaust gas purifier comprising:

an expansion pipe having an upstream end for connection to an exhaust gas discharge pipe of an internal combustion engine and a downstream end which is closed, exhaust gas discharge opening means formed in said expansion pipe adjacent said upstream end thereof, an exhaust gas passable thin-walled catalyst element surrounding said expansion pipe upstream end and enclosing said exhaust gas discharge opening means; and a sealing sheet enclosedly surrounding said exhaust gas passable thin-walled catalyst element and being operative to collect exhaust gas passed through said catalyst element and to conduct it therefrom.

2. An exhaust gas purifier according to claim 1, wherein said thin-walled catalyst element comprises a metal sheet having a plurality of holes and a catalyst supported on the surface of said metal sheet.

3. An exhaust gas purifier according to claim 1, including a silencer defined by a casing, the upstream end of said silencer casing containing a catalyst extending across an entire cross-section of a flow path defined by said casing, said flow path communicating with a space sealed by said sealing member.

4. An exhaust gas purifier according to claim 1, wherein said expansion pipe is formed in an elongated shape;

a partition plate disposed within said expansion pipe and defining an elongated silencer in the downstream end of said expansion pipe;

a catalyst element extending across a flow path through said silencer;

said sealing sheet defining a space extending from the upstream end of said expansion pipe to the downstream end thereof; and means communicating said space sealed by said sealing sheet with said flowpath through said silencer upstream of said catalyst element therein.

5. An exhaust gas purifier according to claim 3 or claim 4, including means for supplying secondary air to a region on the downstream side from said exhaust gas discharging opening and on the upstream side of the catalyst in said silencer.

* * * * *